United States Patent [19]
Kalman

[11] Patent Number: 5,941,542
[45] Date of Patent: Aug. 24, 1999

[54] LOAD TRANSPORTING TRAILER

[76] Inventor: Frank Kalman, 4203 Poinsettia Ave., San Luis Obispo, Calif. 93401

[21] Appl. No.: 08/685,164

[22] Filed: Jul. 23, 1996

[51] Int. Cl.[6] .................................................. B62B 1/04
[52] U.S. Cl. ............................. 280/38; 211/17; 211/20; 224/924; 280/39; 280/40; 280/47.19; 280/65; 280/124.109; 280/124.11; 280/656; 296/182
[58] Field of Search ............................. 296/182; 211/17, 211/20; 224/924 XC, 537; 280/656, 38, 39, 40, 652, 47.131, 47.19, 63, 65, 769, 47.26, 47.24, 124.108, 124.09, 124.11, 124.162; 267/221, 34, 64.15

[56] References Cited

U.S. PATENT DOCUMENTS

| | | | |
|---|---|---|---|
| 639,991 | 12/1899 | Jewell . | |
| 2,468,914 | 5/1949 | Banaszak et al. | 280/40 |
| 2,469,506 | 5/1949 | Kerr et al. | 280/33.4 |
| 2,594,655 | 5/1952 | Converse | 280/47.131 |
| 2,879,072 | 3/1959 | Rear et al. | 280/40 |
| 3,025,985 | 3/1962 | Crawford | 214/505 |
| 3,367,675 | 2/1968 | Gearin | 280/34 |
| 3,451,690 | 6/1969 | Cravens | 280/40 |
| 3,781,030 | 12/1973 | Ekedal | 280/36 |
| 3,941,406 | 3/1976 | Eggleston | 211/17 |
| 3,966,223 | 6/1976 | Carr | 280/124.162 |
| 4,230,340 | 10/1980 | Wasservogel | 280/656 |
| 4,344,643 | 8/1982 | Ray | 280/124.162 |
| 4,442,961 | 4/1984 | Bott | 224/42.03 B |
| 5,265,897 | 11/1993 | Stephens | 280/293 |
| 5,364,081 | 11/1994 | Hartl | 280/124.108 |
| 5,549,231 | 8/1996 | Fletcher et al. | 224/536 |

FOREIGN PATENT DOCUMENTS

| | | | |
|---|---|---|---|
| 542683 | 8/1922 | France | 280/63 |
| 861258 | 2/1941 | France | 280/65 |
| 926527 | 4/1955 | Germany | 280/39 |
| 223126 | 6/1985 | Germany | 280/656 |
| 319657 | 7/1934 | Italy | 280/65 |

*Primary Examiner*—Eric Culbreth
*Attorney, Agent, or Firm*—Leo F. Costello

[57] ABSTRACT

A lightweight, low profile trailer especially suited for transporting bicycles. The trailer includes pivotally interconnected upper load supporting and lower suspension frames which have load supporting, suspension, storage, and parking functions. Bicycle supports and clamps are mounted for and aft on the load supporting frame. The suspension frame is located under the load supporting frame in the earth-traversing mode of the trailer and is pivoted for upward and downward movement. Trailer wheels are mounted on opposite sides of the lower frame for movement between ground-engaging positions disposed outwardly of the sides of the upper frame and stowing positions folded under the lower frame. A shock absorber is interposed the upper and lower frames intermediate the wheels for resiliently cushioning the upper frame and thus bicycles thereon during earth traversal of the trailer. The frames are movable between a traveling position wherein the frames are generally horizontal and the wheels are in their ground-engaging positions and a stowing position wherein the frames are upright in a generally A-shaped relation and the wheels are in their stowing positions. A towbar is interchangeably connected to the load supporting frame when the trailer is in its traveling position and to the suspension frame when the trailer is in its stowed position to aid in supporting the trailer. The frames are titlable with a load of bicycles into a parking position.

20 Claims, 5 Drawing Sheets

LOAD TRANSPORTING TRAILER

FIELD OF THE INVENTION

The present invention pertains to a load transporting trailer and more particularly to a trailer which has load supporting, suspension, storage, and parking functions and which is especially suited for transporting bicycles.

BACKGROUND

Bicycles are commonly transported on the back, top or front of a motor vehicle, motor home, house trailer, or the like. They are normally carried in an upright position on a bracket attached to the front or back of the vehicle or on rails attached to the top of the vehicle. Various types of clamps, straps or cords are used to secure the bike to the bracket or rail. These transporting methods have been used for many years and do an effective job in transporting bicycles, but they do have their limitations.

One of the problems of transporting bicycles on an automobile is the possibility of damaging the vehicle or the bicycles if the bicycles are dropped, fall over, or otherwise strike the body of the vehicle, causing dents or scratches. Another problem is the very fact that the bicycles are attached to the vehicle. It may be desirable to separate the bicycles from the vehicle in order to use the vehicle without the bicycles attached, while at the same time maintaining the bicycles in a secured position for storage purposes. Also, many people are uncomfortable driving an automobile with bicycles on the roof or hanging from the front or rear of the vehicle. Still further, these conventional transporting methods are limited in the number of bicycles that can be transported at one time. In addition, lifting bicycles onto an automobile, especially onto the roof, is difficult and awkward.

Insofar as is known, trailers especially adapted for transporting bicycles have not been developed. Bicycles may of course be carried lying down on many types of trailers, but such a method is of little practical use because of the obvious damage to the bicycle or bicycles. Also, trailers are known for carrying motorcycles, such as disclosed in U.S. Pat. No. 3,781,030, but transporting a bicycle involves problems different from those encountered in transporting a motorcycle, particularly relating to the relative weight and fragility of a bicycle compared to a motorcycle.

SUMMARY

A trailer is provided which is especially suited for transporting bicycles. The trailer includes interconnected upper load supporting and lower suspension frames which have load supporting, suspension, storage, and parking functions. Bicycle supports and clamps are mounted fore and aft on the load supporting frame. The suspension frame is located under the load supporting frame in the earth-traversing mode of the trailer and is attached to the supporting frame for upward and downward movement. Trailer wheels are mounted on opposite sides of the lower frame for movement between ground-engaging positions disposed outwardly of the sides of the upper frame and stowing positions folded under the lower frame. A shock absorber is interposed the upper and lower frames intermediate the wheels for resiliently cushioning the upper frame and thus bicycles thereon and for maintaining the same in level upright positions during earth traversal of the trailer. The frames are movable between a traveling position wherein the frames are generally horizontal and the wheels are in their ground-engaging positions and a stowing position wherein the frames are upright in a generally A-shaped relation and the wheels are in their stowing positions. A towbar is interchangeably connected to the load supporting frame when the trailer is in its traveling position and to the suspension frame when the trailer is in its stowed position to aid in supporting the trailer. The frames are titlable with a load of bicycles into a parking position.

An object of the present invention is to provide a trailer with a frame construction that has load supporting, suspension, storage, and parking functions.

Another object is transport a plurality of bicycles in a secure and dependable manner.

A further object is to obviate the need for transporting bicycles on the body of a motor vehicle, motor home, or house trailer.

Yet another object is enable bicycles to be transported by a motor vehicle without being attached to the body of the vehicle and so that the bicycles can be separated from the vehicle while still held in secure positions for storage purposes.

Another object is to provide a trailer which has the capability of dependably transporting a plurality, at least five or more but fewer if desired, bicycles in spaced, upstanding positions at highway speeds and around corners while still maintaining their upright positions and without imposing undesired reactive forces on the drawing vehicle.

Yet another object is to provide a suspension system for a trailer that minimizes weight, reduces sway during cornering of the trailer, and magnifies the compliant capabilities of a shock absorber used in the suspension system.

A still further object is to provide a trailer that is lightweight and balanced and otherwise constructed so that, with or without an applied load such as a plurality of bicycles, it can be manually maneuvered into various positions or modes, including an earth traversing mode, a parking mode, and a storage mode.

Another object is to provide a trailer that has a low profile to facilitate its loading and unloading especially with a plurality of bicycles.

A further object is to provide a suspension system for a trailer for carrying bicycles which enables damage-free transport of the bicycles at highway speeds under various weather conditions which, notwithstanding its lightweight, maintains the bicycles in balanced upright positions and which has sufficient road traction to avoid flipping over.

Yet an additional object is to enable more bicycles to be transported at one time than can typically be transported on presently available bicycle transporting equipment.

Another object is to provide a trailer that can be manufactured and sold in kit form.

A further object is to provide a trailer that is collapsible and can be stood on end for storage purposes.

Still another object is to provide a trailer that can be dependably and compactly stored in a standing position against a garage wall.

A feature of this invention is that the trailer tongue or drawbar serves for drawing the trailer and for supporting the trailer in its stowed position.

Another object is to provide a trailer which is durable notwithstanding its light weight and assembly from a kit.

These and other objects, features and advantages of the present invention will become apparent upon reference to the following description, accompanying drawings, and appended claims.

DETAILED DESCRIPTION

With reference to FIGS. 1 through 4, a trailer constructed in accordance with the principles of the present invention is identified by the numeral 20. Although subsequently described in greater detail, it is useful at this point to note that the trailer is operable in several different modes or conditions, namely, an earth-traversing mode (FIGS. 1 through 4, 8), a stowing mode (FIG. 5), and a parking mode (FIG. 9). For the most part, the attitudinal references used to describe the trailer assume the earth-traversing mode since this is its principle mode of use.

Figure 2:
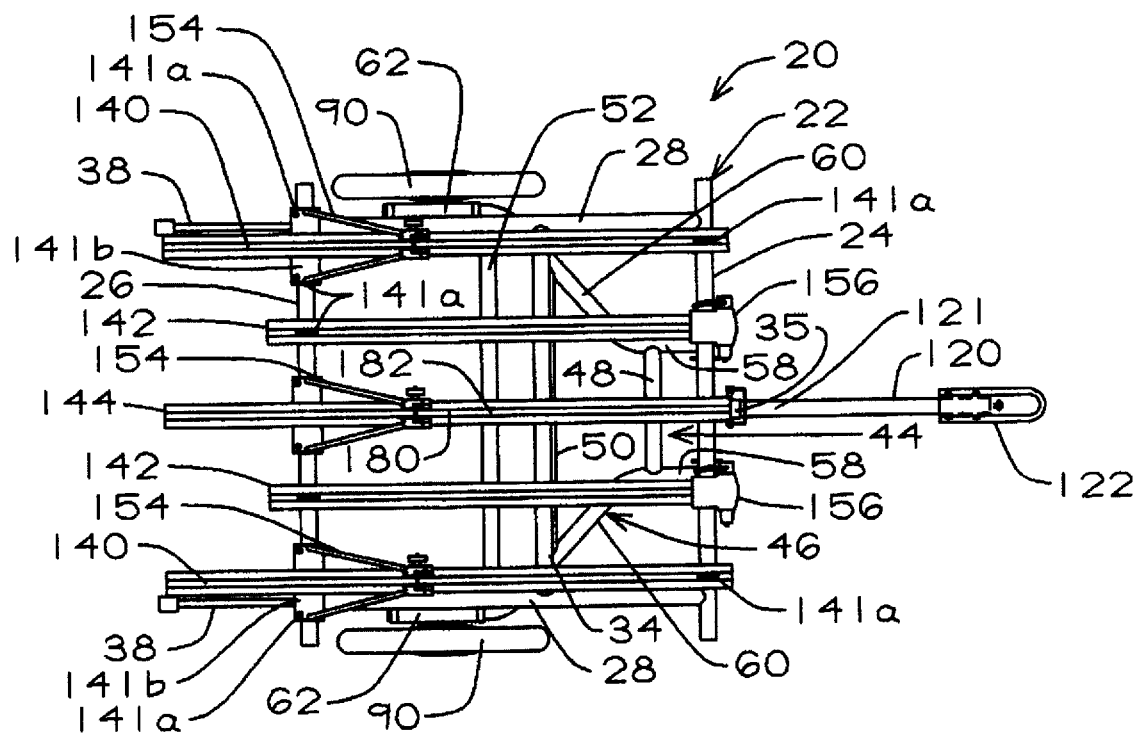
FIG. 2 is a top-plan view of the trailer shown in FIG. 1.
Figure 3:
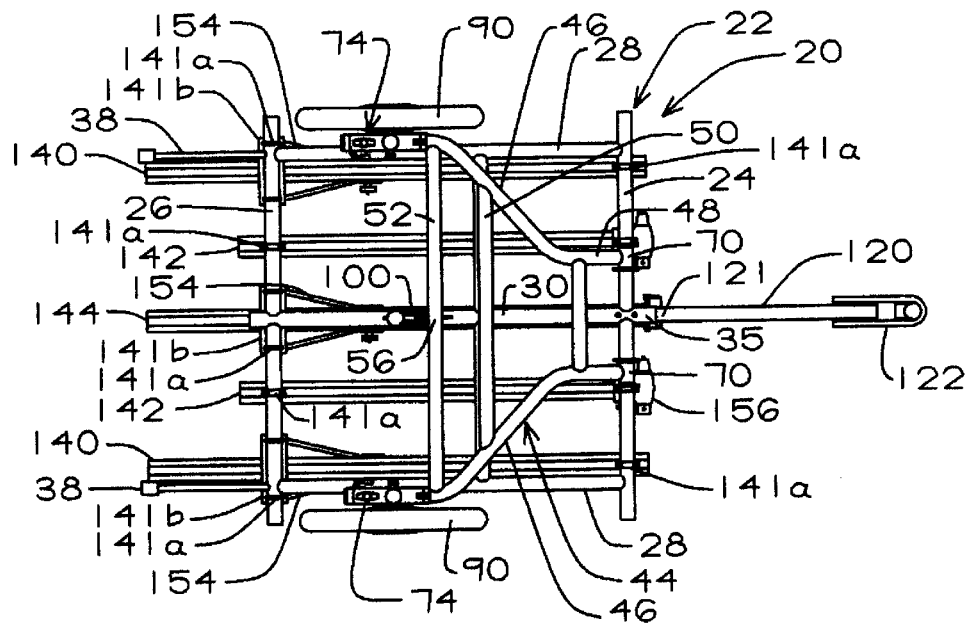
FIG. 3 is a bottom-plan view of the trailer of FIGS. 1 and 2.

Thus, the trailer 20 includes an upper load supporting or main frame 22 preferably of steel tubing welded together in the construction described, it being understood that aluminum could be used if desired. The load supporting frame is composed of straight, coplanar, front, rear, and side tubes 24, 26, and 28 connected in a generally square shape in plan view, as best seen in FIGS. 2 and 3. The load-supporting frame also includes a longitudinal central tube 30 interconnecting the front and rear tubes and a transverse tube 34 interconnecting the side tubes and the central tube.

Figure 4:
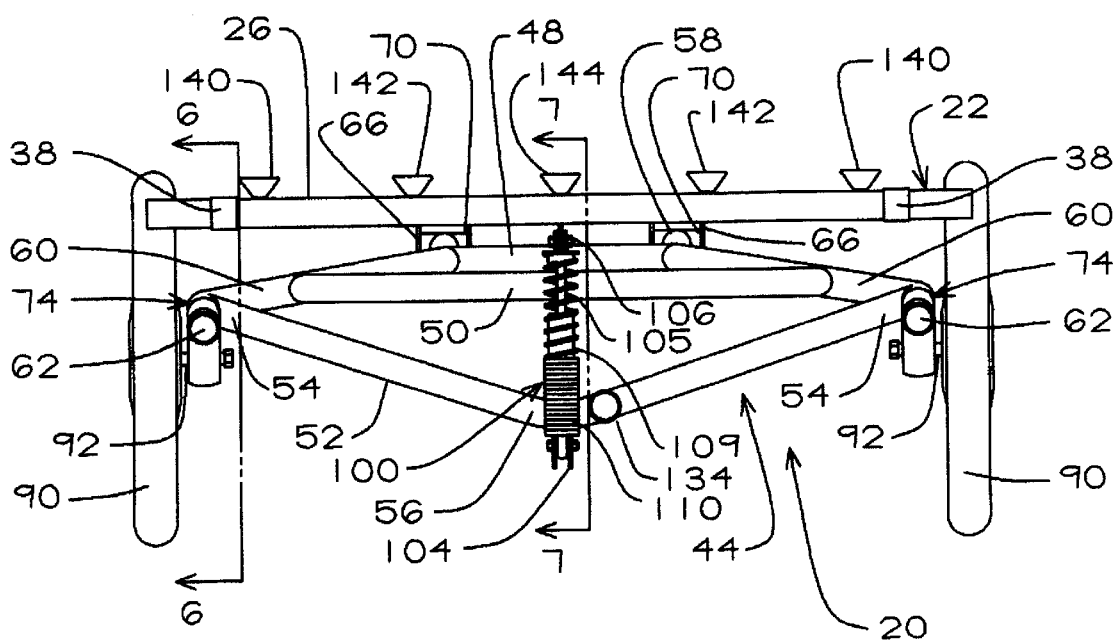
FIG. 4 is an enlarged rear elevation of the trailer shown in FIGS. 1 through 3.

The central tube 30 (FIGS. 2 and 3) defines a longitudinal axis which is an axis of symmetry for the load supporting frame 22 as well as the trailer 20 as a whole and terminates in a front towing socket or coupling 35. The transverse tube 34 is closer to the front tube 24 than to the rear tube 26 and is thus spaced forwardly of the transverse central axis of the load-supporting frame. The front and rear tubes have opposite ends which extend laterally outwardly of the side tubes 28, as best seen in FIGS. 2 through 4. Main stowing legs 38 are respectively secured to the opposite ends of the rear tube 26 and project rearwardly therefrom in generally the same plane as the load-supporting frame 22 and in alignment with the side tubes 28.

The trailer 20 also includes a lower suspension or auxiliary frame 44 which is likewise preferably of steel tubing and welded construction but may be of aluminum as with the main frame 22. The suspension frame has a generally wish-bone shape in plan view, as best seen in FIGS. 2 and 3, and includes a pair of transversely spaced dogleg-shaped side tubes 46 interconnected by front, intermediate, and rear transverse tubes 48, 50, and 52, it being noted that the intermediate tube may optionally be removed to reduce weight. The front and intermediate tubes of the suspension frame are straight and coplanar with the side tubes of the suspension frame, but the rear transverse tube 52 is V-shaped in rear elevation (FIG. 4) with opposite-end portions 54 converging downwardly to a central apex 56. This central apex lies in a longitudinal vertical plane about which the suspension frame is symmetrical.

The side tubes 46 (FIGS. 2 through 4) of the suspension frame 44 include longitudinally extending, transversely spaced, parallel front portions 58 interconnected by the front tube 48. The side tubes 46 also include intermediate portions 60 rearwardly diverging from the front portions and interconnected by the intermediate tube 50. In addition, longitudinally extending rear portions 62 of the side tubes 46 project rearwardly from the intermediate portions in spaced parallel relation to each other and in parallel relation to the front portions. The spacing of the front portions 58 defines the minimum width of the suspension frame, and the spacing of the rear portions defines the maximum width of the suspension frame.

A pair of pivot brackets 66 (FIGS. 1, 3, 4) is releasably attached to the front tube 24 of the load-supporting frame 22 equidistantly on opposite sides of the central tube 30. These brackets support co-axial, horizontal pivot pins 68 in spaced parallel relation to and below the front tube, and bushings 70 are rotatably mounted on the pins. The front portions 58 of the suspension frame are secured to the bushings, thereby pivotally mounting the suspension frame 44 on and underneath the load-supporting frame 22. Thus, the two frames are movable upwardly and downwardly relative to each other.

Having described the pivotal mounting of the suspension frame 44 on the load-supporting frame 22, it is useful to describe certain additional relationships between the two frames (FIGS. 2 and 3) in the preferred embodiment. The length of the suspension frame is approximately three-fourths of the length of the load-supporting frame, as measured by the spacing of the front and rear tubes 24 and 26, and its maximum width is slightly greater than the width of the load-supporting frame. Thus, with the suspension frame pivotally attached to and underneath the load-supporting frame as described, the rear portions 62 of the suspension frame are disposed between and below the outer ends of the front and rear tubes 24 and 26 just outwardly of the side tubes 28 (FIGS. 2 and 4). Furthermore, the apex 56 of the rear transverse tube 52 of the suspension frame is in the same longitudinal vertical plane as the central tube 30 of the load-supporting frame (FIGS. 3 and 4) and is rearwardly adjacent to an imaginary vertical line which passes through the center of the load-supporting frame. As such, the rear transverse tube 52 of the suspension frame is located just rearwardly of said imaginary vertical line.

Figure 6:
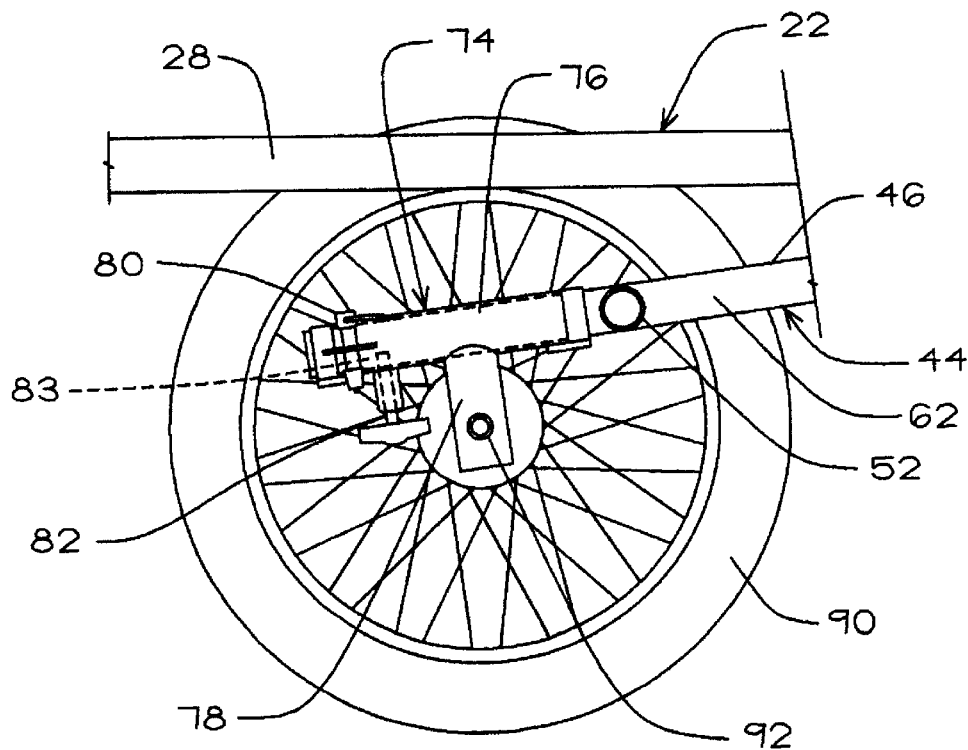
FIG. 6 is an enlarged, longitudinal, fragmentary section taken on Line 6—6 in FIG. 4.

With reference to FIGS. 3, 4, and 6, in particular, wheel mounts 74 are releasably connected to the rear portions 62 of the side tubes 46 of the suspension frame 44. Each mount includes a sleeve 76 rotatably received on its respective rear portion 62, a tubular arm 78 perpendicularly extending from the sleeve, a quick-release clamp 80, and a retaining pin 82. The clamp is a well-known over-center device connected to the sleeve and movable between a clamping position frictionally resisting rotation of the sleeve on the rear portion 62 and a releasing position permitting such rotation. The retaining pin is also connected to the sleeve and is radially movable between a locked position extending through the sleeve into an aligned hole 83 in the rear portion 62 to preclude rotation of the sleeve on the rear portion and an unlocked position which permits such rotation.

Figure 5:
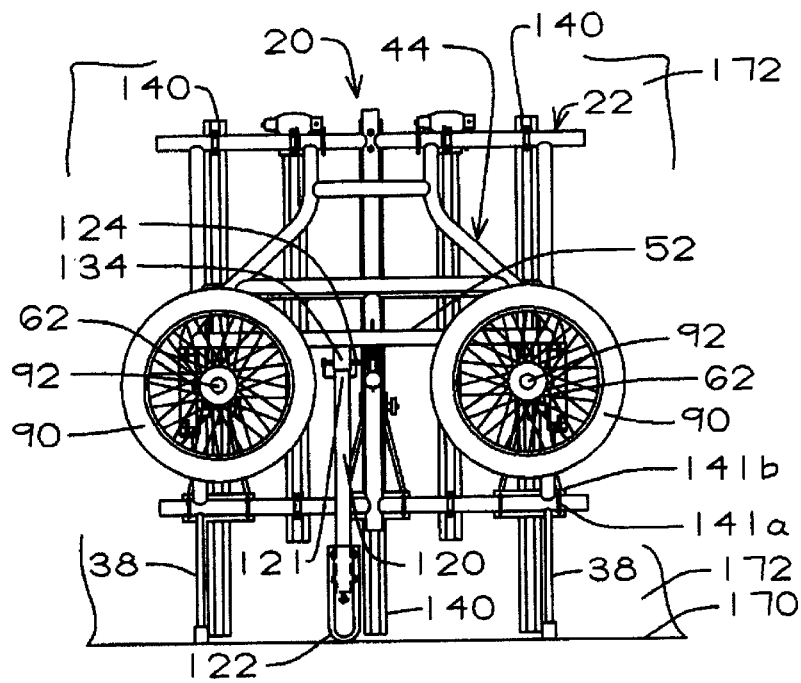
FIG. 5 is a bottom-plan view of the trailer of FIGS. 1 through 4, but in its stowed mode.

Trailer wheels 90 having axles 92 are individually releasably rotatably mounted on the arms 78 of the wheel mounts 74 with the axes of the wheels perpendicular to the rear portions 62 of the side tubes 46 of the suspension frame 44. In addition, the wheels are pivotally or rotationally movable on their mounts 74 from vertical earth-traversing positions disposed outwardly of the rear portions 62, as shown in FIGS. 2 through 4, into stowing positions flat against the rear tube 52, as shown in FIG. 5. More specifically, with the quick-release clamps 80 in their releasing positions and with the retaining pins 82 in their unlocked positions, the wheels can be pivoted on the rear portions 62 between their earth-traversing and stowing positions. In the earth-traversing positions, the wheels are parallel to each other, and in the stowing positions, the wheels are in an obtuse angular relation to each other. In the earth- traversing position, the quick-release clamps are moved into their clamping positions, and the retaining pins are moved into their locking positions, so as to hold the wheels in such position. Such clamping and pinning are unnecessary in the stowing position since the weight of the wheels holds them against the suspension frame 44.

Figure 7:
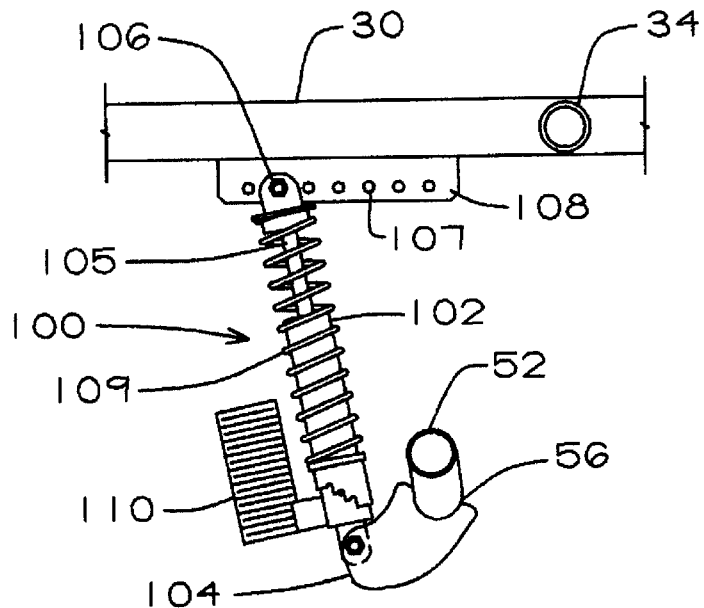
FIG. 7 is a longitudinal fragmentary vertical section taken on Line 7—7 in FIG. 4.

The trailer 20 also includes a single shock absorber 100 (FIGS. 3 through 5) preferably of the type commonly used in motorcycles. Although the invention is not limited to any particular brand of shock absorber, it is preferred to use a Koni shock absorber EC-315 or Yamaha 401-22210-74-00, either of which is available at motorcycle stores. Thus, the shock absorber includes an hydraulic cylinder 102 (FIG. 7) releasably pivotally attached to a lower mounting bracket 104 projecting from the apex 56 of the rear tube 52 of the suspension frame 44. The shock absorber also includes a piston rod 105 having an upper end releasably and adjustably connected by a pin 106 through one of several longitudinally spaced holes 107 to an upper mounting bracket 108 attached to the central tube 30 of the load-supporting frame 22 at about the center thereof. The shock absorber also includes a coil spring 109 around the cylinder and piston rod and having opposite ends bearing against the upper and lower mounting brackets. The shock absorber also includes an oil reservoir 110 mounted adjacent to the cylinder. With particular reference to FIGS. 3 and 4, it is noted that the shock absorber is located at approximately the intersection of the central longitudinal and transverse vertical planes of the trailer 20. The shock absorber is thus interposed the load-supporting and suspension frames 22 and 44 and resiliently resists and cushions movement of the frames toward and away from each other.

A towbar 120 (FIGS. 1 through 3) has a rear end 121 releasably insertable into and connectable to the front towing socket or coupling 35 and a front end 122. A link pin 124 releasably secures the rear end of the towbar to the socket 35, and a latch 126 releasably connects the front end to the hitch [not shown] of a vehicle 130 as partially shown in FIG. 1, in the earth-traversing mode of the trailer 20. A stowing socket or coupling 134 (FIG. 5) is affixed to the rear tube 52 of the suspension frame 44 and extends rearwardly therefrom generally parallel to the rear portions 62. The rear end of the towbar is also releasably insertable into and connectable to the stowing socket by the link pin 124 for stowing the trailer in a manner to be more specifically described hereinafter.

Figure 1:
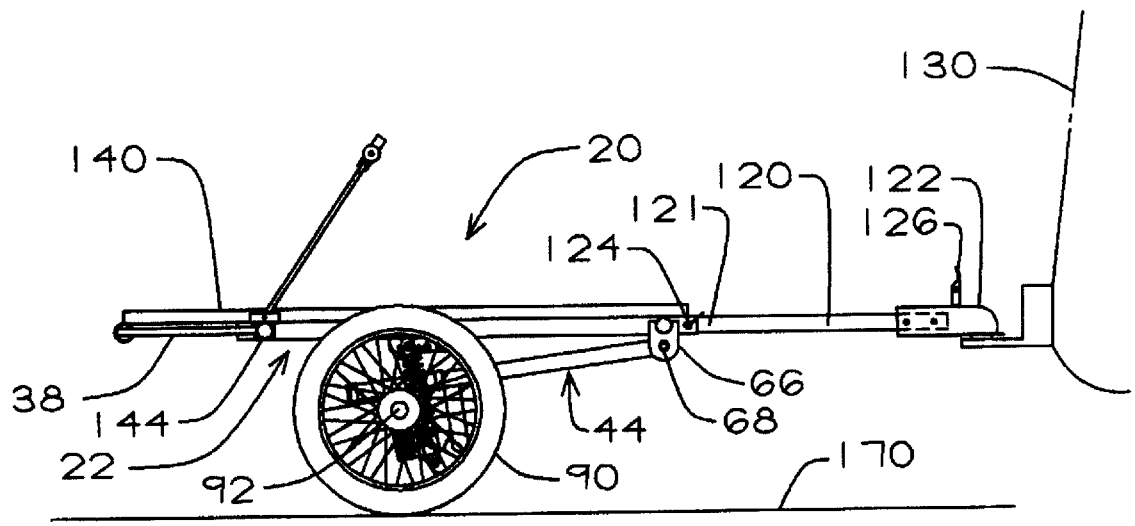
FIG. 1 is a side elevation of the subject trailer in its earth-traversing mode and connected to a vehicle which is partially shown in side elevation.

With reference to FIGS. 1, 2, and 4, outside upwardly opening bicycle channels or rails 140 extend lengthwise or fore and aft of the trailer 20 and are releasably secured by U-shaped fasteners 141a and cross plates 141b or by the U-shaped fasteners alone to the front and rear tubes 24 and 26 of the load-supporting frame 22; intermediate bicycle channels 142 and a central bicycle channel 144 are similarly disposed and releasably secured to the front and rear tubes. The cross plates extend transversely of the channels and are fastened thereto by screws or bolts and the U-fasteners extend around the tubes and have threaded legs projecting through the plates with nuts threaded down on legs against the plates. At the end of the channels where the U-shaped fasteners are used alone, the fasteners extend around the tubes, the legs extend through the channels, and nuts are threaded down on the legs against the channels. The outside and central channels are relatively long to accommodate longer bicycles whereas the intermediate channels are shorter for shorter bicycles, as seen in FIG. 2, but such lengths may be varied as desired. Typically, the long channels 140 are about fifty-two inches long, whereas the shorter channels 142 are about forty-six inches in length. Even shorter channels of about eight inches may be used on these channels, as 142, to receive the rear bicycle wheel 148 where a fork clamp 156 is employed.

Furthermore, the channels 140, 142, 144 (FIGS. 1, 2, and 4) are preferably substantially uniformly transversely spaced on the load-supporting frame 22. It is noted that the outside channels are disposed just inwardly of the side tubes 28 in order to facilitate attachment of these channels to the front and rear tubes by the U-fasteners 141a. The channels are releasably secured to the main frame 22 by the fasteners 141a and 141b since one of the objectives of the invention is to enable assembly of the subject trailer 20 from a kit. Also, another reason is so that the channels can be interchangeable or to allow channels with different lengths to be used, or to replace the channels if damaged.

Each of the channels 140, 142, and 144 is of a width just sufficient to receive the tire or wheel, as 148, of a bicycle as 150 so that the wheels are restrained against lateral movement. In order to secure the bicycles to the trailer 20, bicycle frame clamps 154 and bicycle fork clamps 156 are mounted for use in association with the various channels. These clamps, per se, are well-known and are thus not shown nor described in detail. Basically, however, and as shown in the preferred embodiment, three frame clamps are pivotally mounted on the fasteners 141b in alignment with the outside and central channels for attachment to the frames 160 of bicycles in the outside and central channels. Also, in the preferred embodiment, two fork clamps are mounted on the front tube 24 in alignment with the intermediate channels directly on these channels for attachment to the forks 162 of bicycles in the intermediate channels, respectively. Optionally one or all of the frame clamps may be mounted on or at the front tube, and one or both the fork clamps may be mounted on or at the rear tube; also, all frame clamps or all fork clamps may be used.

Figure 8:
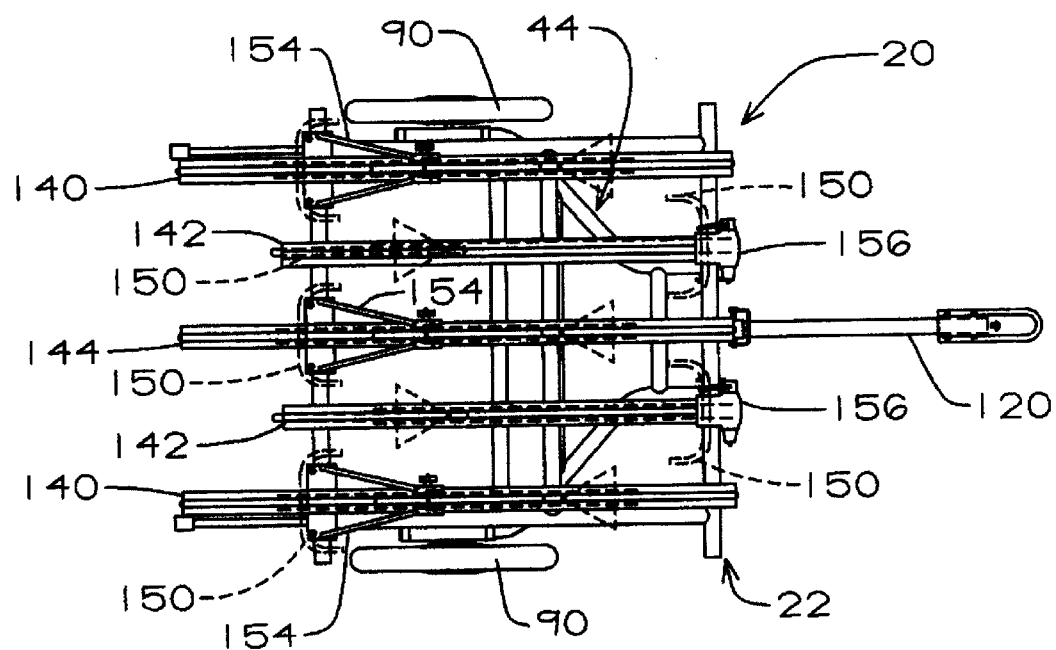
FIG. 8 is a plan view of the trailer of FIGS. 1 through 4 showing bicycles in phantom supported on the trailer and with the trailer in its earth-traversing mode.
Figure 9:
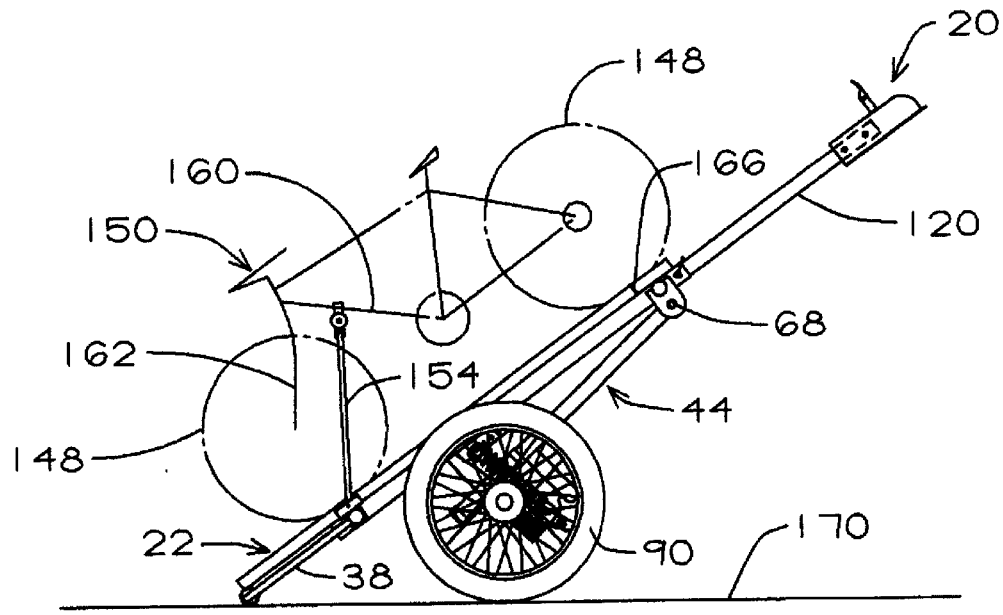
FIG. 9 is a side elevation of the trailer with a bicycle shown in phantom thereon and with the trailer in its parking mode.

Bicycles 150 can thus be mounted on the load-supporting frame 22 with the two wheels 148 of each bicycle positioned in one of the channels 140, 142, or 144 (FIGS. 8 and 9). In the outside and central channels, the frame clamp 154 is attached to the front (down tube) of the frame 160 of the bicycle, and an auxiliary clamp or strap 166 fastens the rear wheel to the channel. To use a fork clamp 156, the front wheel of the bicycle 150 is removed, and the rear wheel is positioned in one of the intermediate channels 142. The front fork of such bicycle is positioned in and secured to the fork clamp 156 which is aligned with the selected channel. Here again, an auxiliary clamp or strap secures the rear wheel to its respective channel. In this manner, a plurality (five in the disclosed embodiment) of bicycles can be mounted and secured in upstanding side-by-side positions on the trailer 20.

Also, the distance between the front and rear tubes 24 and 26 from centerline to centerline is about forty-two inches, thereby approximately the centerline-to-centerline distance between the front and rear axle of a standard adult-size bicycle, i.e., the wheel base of such bicycle.

Although the subject invention is not limited to any particular dimensions, the specific dimensions of the preferred embodiment of the trailer 20 are now set forth by way of example. In this regard, it is noted that FIGS. 1 through 9 are drawn to scale. Thus, the length of the trailer $L_T$ is seven and a half feet or ninety inches, the width of the trailer $W_T$ is four feet three inches, or fifty-three inches, the height $H_T$ of the trailer is twenty-five inches, and the length $L_{TB}$ of the towbar 120 is thirty-six inches. With these selected dimensions, and recognizing that the drawing FIGS. 1 through 9 are to scale, the remainder of the dimensions can readily be determined. In addition, one of the advantages of the subject trailer 20 is its light weight. When the preferred and herein described embodiment of the trailer of the identified dimensions is empty, it has a total weight of one hundred thirty-five pounds and when it is fully loaded with five standard-size bicycles it has a weight of approximately two hundred eighty-five pounds.

With reference to FIGS. 2 and 8, when the trailer 20 is fully loaded with five bicycles 150 of standard construction, the center of gravity of the load of bicycles is approximately at point 180, which lies in the intersection of the planes containing the longitudinal center line of the trailer and the vertical plane containing the axes of the wheels 90. The center of gravity moves forwardly somewhat to point 182 if fewer bicycles are loaded on the trailer on the inside and central channels 142 and 144 or depending on the number and location of the channels 140, 142, and 144 selected for a particular trailer according to the choice of the user.

OPERATION

The operation of the trailer 20 is described with reference to the three principal modes of operation of the trailer, namely, the earth-traversing, parking, and stowing modes. To describe the earth-traversing mode, it is assumed the trailer is initially empty as shown in FIGS. 1 and 2. For loading or unloading purposes, the load-supporting frame 22 is either in a horizontal attitude, as shown in FIG. 1, or in a rearwardly tilted attitude, as shown in FIG. 9. If the horizontal attitude is chosen, the towbar 120 is preferably initially coupled to the hitch of a vehicle 130, rested on some support such as a box so as to support the load-supporting frame in the horizontal attitude, or merely rested on the ground 170. As above noted, the preferred embodiment has a height of about twenty-five inches so with such a low profile, the trailer is easy to load, or unload with bicycles 150, in contrast to the roof of an automobile. After each bicycle is placed in its respective channel 140, 142, it is secured to the trailer by the appropriate frame or fork clamps and auxiliary clamps 154, 156, and 166, respectively, in the manner set forth above.

Assuming that five bicycles 150 are secured on the load-supporting frame 22 as above described, the bicycles are thus supported in upstanding side-by-side positions and in a generally level plane, as represented by the plane of the load-supporting frame, when the trailer 20 is in earth-traversing position (FIGS. 1 and 8). It is also noted that the spacing between the frames of the bicycles in adjacent channels is less than width of the handle bars of a bicycle. The center of gravity 180 is just forward of the axes of the wheels 90 so that the load of bicycles is well balanced. With the towbar 120 attached to the vehicle 130, the load is maintained in its substantially level position while the suspension frame 44 is allowed to move up and down relative to the load-supporting frame.

If it is desired to transport fewer than five bicycles 150, the subject trailer 20 allows bicycles to be loaded so as to maintain an appropriate balance. That is, if, for example, four bicycles are transported, they are placed in the outside and intermediate channels 140 and 142, leaving the central channel free, thereby maintaining the balance of the load on the supporting frame with the center of gravity at point 180. If three bicycles are transported, they are loaded on either the outside channels 140 and the central channel 144, or on the intermediate channels 142 and the central channel 144; in either case, the center of gravity is maintained in the region between points 180 and 182 forward of the wheel axes. If only two bicycles are transported, they are loaded on either the outside channels or the intermediate channels to maintain balance. Although not as likely, if only a single bicycle is carried, it is placed on the central channel 144. In all cases, balance is maintained and the center of gravity is between points 180 and 182.

During earth-traversing movement of the trailer 20 with its load of bicycles 150, the load supporting frame 22 is maintained in its level position by the action of the suspension frame 44 and the shock absorber 100. If one or both of the wheels 90 encounter a rise or bump, both wheels move up and down in unison so as to maintain the supporting frame level and to minimize sway of the trailer while cornering. Also, the wish-bone or dogleg design of the suspension frame 44 magnifies the shock-absorbing characteristics of the shock absorber 100 and distributes its effect over the load-supporting frame. Thus, the bicycles are maintained substantially level in their upstanding side-by-side relation for damage-free transport at highway speeds. A particularly important advantage is that the suspension frame and shock absorber combination under the load-supporting frame avoids the worst possible suspension failure, namely, having the trailer flip over during highway travel.

Whether loaded or unloaded, tests with the trailer 20 prove that it does not affect handling of the drawing vehicle 130 so that the driver does not feel the presence of the trailer. With proper adjustment of the shock 100, road tests also confirm that vibration or shaking of the bicycles 150 loaded on the trailer is mitigated even while traversing large bumps on secondary roads.

Assuming the trailer 20 with a load of bicycles 150 has reached a particular destination, the subject invention allows the trailer to be disconnected from the vehicle 130 while maintaining the bicycles in their upstanding, side-by-side, secured positions. Thus, the towbar 120 is disconnected from the vehicle and manually lifted off the hitch. The trailer is relatively easy to maneuver manually with the towbar because the load is balanced on the wheels 90. The trailer can be placed in its parking position (FIG. 9) by allowing the load-supporting frame 22 to tilt rearwardly until the legs 38 engage the support surface 170. Because the bicycles are secured to the channels 140, 142, and 144 by the clamps 154, 156, and 166, the bicycles will remain in their upstanding side-by-side positions. Thus, the trailer with its load of bicycles can be parked, and the vehicle 130 can be used without bicycles being attached thereto.

When it is desired to store the trailer 20, any bicycles thereon are first removed, and the towbar 120 is removed from the front coupling 35. The front tube 24 is then grasped and the trailer is manually tilted rearwardly on the legs 38 until it is in a vertical position, as shown in FIG. 5, where it can be rested against the wall 172, indicated by four brackets in FIG. 5 of a garage or other storage facility. With the trailer thus leaning against the wall, the towbar is connected to the storage coupling 134, so that the towbar forms a third leg, along with the legs 38, to provide a three-point dependable support for the trailer. Next, the quick-release clamps 80 and the retaining pins 82 are released and unlocked respectively, and the wheels 90 are pivoted into their stowing or storage positions. As such, the entire trailer occupies a minimum amount of space against the wall since it projects out from the wall only approximately one-half the height of the trailer in normal use.

Figure 10:
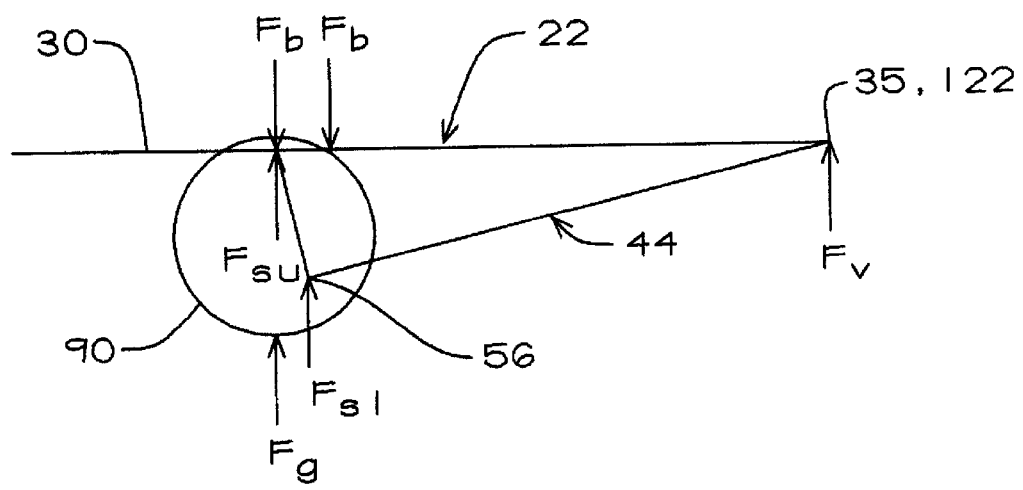
FIG. 10 is a force diagram of the trailer in its earth-traversing mode and showing a representation of a bicycle or bicycles on the trailer.

With reference to the force diagram in FIG. 10, the basic forces acting on the trailer 20 in its earth-traversing mode are briefly described. Thus, the wheels 90 experience ground forces $F_g$ acting upwardly on the wheels. The ground forces $F_g$ are translated through the wheels 90 and axles 92 to the suspension frame 44 where a lower shock absorber force $F_{sl}$ is applied to the shock absorber 100 at the apex 56 of the rear cross-tube 52. In turn, the shock absorber exerts an upper shock absorbing force $F_{su}$ on the central tube 30 of the load-supporting frame 22. The upper shock absorbing force $F_{su}$ is applied approximately at the center of gravity 180, 182 of the load-supporting frame but is distributed throughout the load-supporting frame. Depending on the type of load of bicycles, that is, the number of bicycles and their location on the trailer as above described, the downward force of the load $F_b$ is exerted in the region of the center of gravity 180, 182. The lifting force resulting from hitching of the trailer to a vehicle 130 is designated $F_v$.

As previously mentioned, the trailer 20 is especially suited for manufacture and sale in kit form. Although the load-supporting and suspension frames 22 and 44 are of welded construction, many of the parts of the trailer are releasably interconnected as indicated in the foregoing description. Thus, the load-supporting and suspension frames can be disconnected from each other, the wheels 90 can be released from the wall mounts 74, and the mounts themselves can be removed from the suspension frame. The channels 140, 142, 144 are attached to the load-supporting frame by the releasable fasteners 141 and, of course, the towbar 120 is releasable from the supporting frame. Thus, the parts of the entire trailer can be packaged and sold as a kit, and the ultimate user can assemble these parts into the trailer as described.

From the foregoing it will be understood that a trailer 20 in accordance with the present invention has load-supporting, suspension, and parking functions and is especially useful for transporting bicycles. Bicycles are transported in a secure upstanding position, but the trailer can be disconnected from the towing vehicle and parked with the bicycles in a secure position, thereby allowing the vehicle to be moved without bicycles being attached. Even at highway speeds and over bumpy roads, the bicycles are transported in a safe and dependable manner and without noticeable effect on the towing vehicle. Because of the suspension system, the trailer can traverse corners without significant sway, and although lightweight, it has the proper balance and road traction to avoid flipping over. The trailer can be readily stored without its load of bicycles by standing the supporting and suspension frames 22 and 44 on the legs 38 and the two bar 120, which now functions as a leg, and by folding the wheels 90 against the suspension frame. The light weight and balance of the trailer allows it to be manually maneuvered with a load of bicycles or into its stowing position when empty. Although the preferred embodiment is adapted to carry five bicycles, a wider trailer accommodating more bicycles, for example eight, is within the scope of the invention.

Although a preferred embodiment of the present invention has been shown and described, various modifications and substitutions may be made thereto without departing from the spirit and scope of the invention. Accordingly, it is to be understood that the present invention has been described by way of illustration and not limitation.

What is claimed is:

1. A trailer, comprising:

a load-supporting frame having forward and rearward ends and opposite sides;

a suspension frame extending transversely of and mounted under the load-supporting frame for vertical movement relative thereto;

a pair of transversely spaced ground-engaging wheels mounted on the suspension frame adjacent to the opposite sides of the load-supporting frame for unified vertical movement with the suspension frame; and a shock absorber interposed said frames intermediate the wheels, the shock absorber including a spring and a motion damper that cushion vertical movements of the load supporting frame and maintain it in a substantially level plane during earth traversing movement of the trailer while the suspension fame and the wheels are allowed to move vertically relative to the load supporting frame, wherein the wheels are pivotally mounted on the suspension frame on pivot axes that extend fore and aft of the suspension frame so that the wheels can move between earth traversing positions in substantially parallel relation to each other and stowing positions against the suspension frame.

2. The trailer of claim 1, wherein the load supporting frame includes bicycle fastening members thereon.

3. The trailer of claim 2, wherein the fastening members are disposed lengthwise and spaced transversely of the load supporting frame and are thereby adapted to fasten bicycles on the load supporting frame so they extend lengthwise of the frame and are spaced from each other transversely of the frame.

4. The trailer of claim 2, wherein the fastening members are adapted to interconnect each bicycle and the load supporting frame from a position under each bicycle and without extending above any of the bicycles.

5. A trailer, comprising:

a load-supporting frame having forward and rearward ends and opposite sides;

a suspension frame extending transversely of and mounted under the load-supporting frame for vertical movement relative thereto;

a pair of transversely spaced ground-engaging wheels mounted on the suspension frame adjacent to the opposite sides of the load-supporting frame for unified vertical movement with the suspension frame; and a shock absorber interposed said frames intermediate the wheels for cushioning the load supporting frame and for maintaining it in a substantially level plane during earth traversing movement of the trailer, said trailer having an earth traversing mode wherein the frames are generally horizontally disposed and the wheels are in engagement with a support surface and a stowing mode wherein the frames are generally vertically disposed in upstanding relation to a support surface and in side-by-side relation to each other, wherein the load-supporting frame has a pair of legs projecting rearwardly from the rearward end thereof;

wherein the suspension frame has a rearward support coupling, and wherein the trailer includes a towbar interchangeably connected to the forward end of the load supporting frame in said earth traversing mode and to the support coupling in said stowing mode, said legs and towbar being engagable with said support surface and providing a three-point support for the trailer in the stowing mode.

6. The trailer of claim 5, wherein the wheels are pivotally mounted on the suspension frame on pivot axes that extend fore and aft of the suspension frame so that the wheels can move between earth traversing positions in substantially parallel relation to each other and stowing positions pivoted inwardly from their earth traversing positions.

7. A trailer, comprising:

a load-supporting frame having forward and rearward ends and opposite sides;

a suspension frame extending transversely of and mounted under the load-supporting frame for vertical movement relative thereto;

a pair of transversely spaced ground-engaging wheels mounted on the suspension frame adjacent to the opposite sides of the load-supporting frame for unified vertical movement with the suspension frame; and a shock absorber interposed said frames intermediate the wheels for cushioning the load supporting frame and for maintaining it in a substantially level plane during earth traversing movement of the trailer, said trailer having an earth traversing mode wherein the frames are generally horizontal disposed and a parking mode wherein the frames are tilted rearwardly and the wheels are in ground engagement, and wherein the load-supporting frame has a pair of ground-engaging legs projecting rearwardly from the rearward end thereof, said legs being long enough to contact the ground while the wheels remain in contact with the ground and the frames are tilted rearwardly whereby both the legs and the wheels support the frames in said parking mode.

8. A bicycle trailer having earth traversing and stowed modes, comprising:

a main bicycle supporting frame having a forward towing end, a rearward end and opposite sides;

bicycle fastener on the main frame;

an auxiliary suspension frame having forward and rearward portions and opposite sides and being located under the main frame when the trailer is in its earth traversing mode the forward portion of the auxiliary frame being pivotally attached to the forward end of the main frame for movement of the frames toward and away from each other;

a pair of trailer wheels individually mounted on the opposite sides of the auxiliary frame for movement between ground-engagable positions generally perpendicular to the auxiliary frame and stowable positions folded against the auxiliary frame; and a shock absorber interposed the main and auxiliary frames intermediate the trailer wheels for resiliently cushioning the main frame in response to forces imposed on the auxiliary frame from ground engagement of the wheels during earth-traversing movement of the trailer.

9. The trailer of claim 8, further including:

legs on the main and auxiliary frames for supporting the trailer in its stowed mode wherein the main and auxiliary frames are generally vertically disposed.

10. The trailer of claim 8 wherein the trailer also has a parking mode, further including:

legs on the main frame cooperating with the wheels to support the trailer in its parking mode with bicycles supported thereon wherein the main frame and the bicycles thereon are maintained in an upwardly inclined attitude and the bicycles are maintained in their upright positions.

11. The trailer of claim 8, wherein there are a plurality of elongated bicycle channels on the main frame extending lengthwise thereof and in substantially uniformly spaced relation transversely of the main frame, and wherein the bicycle fasteners include clamps on the main frame, each clamp being respectively associated with a channel and adapted to clamp to the frame of a bicycle whose wheels are in its respective channel.

12. A bicycle trailer, comprising:

an upper bicycle supporting frame having forward and rearward portions, opposite sides, and upper and lower surfaces;

elongated wheel-receiving channels mounted fore and aft on the upper surface of the upper frame in transversely spaced relation thereacross, each of said channels being approximately the width of a bicycle tire;

a first towbar coupling mounted on the forward portion of the bicycle supporting frame substantially equidistantly between the opposite sides thereof;

a lower suspension frame having forward and rearward portions and opposite sides, being located under the upper frame; with the forward portion of the lower frame pivoted to the forward portion of the upper frame for movement of the lower frame upwardly toward and downwardly away from the upper frame;

a pair of wheels;

wheel mounts rotatably mounting the wheels individually on the opposite sides of the lower frame and supporting the suspension frame for earth traversing movement and pivotally mounted to the frame for movement between traveling positions disposed outwardly of the sides of the upper frame and stowing positions folded under the lower frame;

a resiliently compressible shock-absorber interposed the upper and lower frames intermediate the wheels for resiliently cushioning movement of the lower frame toward the upper frame during earth traversing movement of the wheels, said frames being movable between a traveling position wherein the frames are generally horizontal and the wheels are in their traveling positions and a stowing position wherein the frames are upstanding from a support surface and the wheels are in their stowing positions;

a second towbar coupling mounted on the suspension frame between the wheels;

legs projecting rearwardly from the bicycle supporting frame for engagement with a support surface in the stowing position; and a towbar interchangeably connectable to the first and second couplings respectively when the trailer is in its traveling position for attachment to a drawing vehicle and when the trailer is in its stowing position, said legs and towbar forming a triangular, three point support for the trailer in said stowing position.

13. The trailer of claim 12, wherein the shock absorber is an hydraulic shock absorber including a piston-cylinder unit surrounded by a coil spring and having opposite ends respectively connected to the supporting and suspension frames on the longitudinal centerlines thereof.

14. The trailer of claim 12, wherein the suspension frame has a wishbone shape with a pair of substantially parallel forward portions dependently pivoted on the forward end of the bicycle supporting frame on opposite sides of the longitudinal centerline of such bicycle supporting frame, a pair of intermediate portions diverging rearwardly from the front portions, and a pair of substantially parallel rear portions adjacent to the sides of the bicycle supporting frame, both of said frames being symetrically disposed relative to the longitudinal centerline of the trailer;

wherein the rotational axes of wheels for earth traversing travel of the trailer are located at or rearwardly of the center of gravity of the thereof; and wherein the shock absorber is a single shock absorber including a piston-cylinder unit surrounded by a coil spring and operational on an axis which is in the plane of the longitudinal axis of the trailer, is disposed substantially equidistantly between the wheels, and is at or rearward of said center of gravity.

15. A trailer, comprising:

a generally planar, load-supporting frame;

fasteners on the frame for mounting one or more bicycles in upstanding position on the frame;

a towbar for connecting the frame to a towing vehicle;

ground engaging means including ground-engaging members mounting the frame for earth traversing movement of the frame in a generally horizontal attitude and for elevational movement of the ground-engaging members relative to the frame; and shock absorbing means interposed the frame and the ground engaging means including a shock absorber having an axially aligned spring, piston and cylinder for maintaining traction of the ground-engaging means with the ground and also maintaining the frame in its generally horizontal attitude by cushioning and dampening relative movement between the frame, with bicycles thereon, and the ground-engaging means during said earth traversing movement, wherein the frame has opposite sides; and wherein the ground-engaging members are movable between earth traversing positions for supporting the frame off the ground and stowed positions tucked under the frame.

16. A trailer, comprising:

a load-supporting frame having forward and rearward ends and opposite sides, said frame having an earth traversing mode and providing a trailer bed lying in a generally horizontal plane when in said earth traversing mode;

trailer wheels;

wheel mounts mounting the frame on the wheels for movement between earth traversing positions wherein the wheels are upright in transversely spaced relation on the frame and stowed positions wherein the wheels are folded under the bed thereof; and a tripod connected to the frame and having three downwardly projecting legs in triangular relation to each other for supporting the trailer in upstanding position at three points on a horizontal surface when the wheels are in their stowed positions.

17. In a bicycle trailer:

a frame defining a trailer bed on which bicycles can be carried;

clamps on the trailer bed of the frame capable of supporting a plurality of bicycles in upstanding side-by-side relation by individually clamping each bicycle from below in its upstanding position and maintaining it separated from an adjacent bicycle thereby creating a load of bicycles having a predetermined center of gravity located centrally of the load, a wheel-supported structure mounted to the frame for allowing earth traversing movement of the frame in a predetermined forward direction and pivoting movement of the frame about a fulcrum which is at or spaced rearwardly of said center of gravity, a tow bar connected to the frame adapted to apply towing force to the frame and structure in said predetermined forward direction and along a tow line intersecting said center of gravity, and a shock-absorber interposed the frame and the structure, wherein the shock-absorber includes at least one fluid-actuated cylinder connected to one of the structure and the frame, a piston rod extending from the cylinder and connected to the other of the structure and the frame, and a coil spring around the cylinder and the piston rod having opposite ends applying force respectively to the structure and the frame.

18. The trailer of claim 17, wherein the points of connection of the cylinder and the piston rod are respectively above and below said fulcrum.

19. In a bicycle trailer having earth traversing and stowed modes, a main bicycle supporting frame having a forward towing portion and a rearward portion;

clamps adapted to attach bicycles in upright positions on the main frame;

an auxiliary suspension frame having forward and rearward portions and being located under the main frame, the forward portion of the auxiliary frame being pivoted to the forward portion of the main frame for elevational movement of the auxiliary frame toward and away from the main frame;

a trailer wheel mounted on the auxiliary frame for movement between a ground engaging position generally perpendicular to the auxiliary frame and a stowed position folded under the auxiliary frame; and a shock-absorbing cylinder, piston, and spring unit interposed the main and auxiliary frames and adapted to resiliently cushion and dampen movement of the main frame in response to forces imposed on the auxiliary frame during earth-traversing movement of the trailer.

20. A trailer, comprising:

a supporting frame having forward and rearward portions, opposite sides, and upper and lower surfaces;

a first towbar coupling mounted on the forward portion of the supporting frame substantially equidistantly between the opposite sides thereof;

a lower suspension frame having forward and rearward portions and opposite sides and being located under the upper frame;

the forward portion of the lower frame being pivotally attached to the forward portion of the upper frame for movement of the lower frame upwardly toward and downwardly away from the upper frame;

a pair of wheels;

wheel mounts rotatably mounting the wheels individually on the opposite sides of the lower frame, supporting the suspension frame for earth traversing movement, and pivotally attached to the frame for movement between traveling positions disposed outwardly of the sides of the upper frame and stowing positions folded under the lower frame;

a resiliently compressible shock-absorber interposed the upper and lower frames intermediate the wheels adapted to resiliently cushion movement of the lower frame toward the upper frame during earth traversing movement of the wheels, said frames being movable between a traveling position wherein the frames are generally horizontal and the wheels are in their traveling positions and a stowing position wherein the frames are upstanding from a support surface and the wheels are in their stowing positions;

a second towbar coupling mounted on the suspension frame between the wheels;

legs projecting rearwardly from the supporting frame adapted to engage a support surface in the stowing position; and a towbar interchangeably connectable to the first and second couplings respectively when the trailer is in its traveling position for attachment to a drawing vehicle and when the trailer is in its stowing position, said legs and towbar adapted to support the trailer in said stowing position.

\* \* \* \* \*